United States Patent
Kasahara et al.

(10) Patent No.: US 8,268,494 B2
(45) Date of Patent: Sep. 18, 2012

(54) FUEL CELL SYSTEM

(75) Inventors: Hideo Kasahara, Osaka (JP); Soichi Shibata, Osaka (JP); Hideo Ohara, Osaka (JP); Yoshikazu Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/113,868

(22) Filed: May 23, 2011

(65) Prior Publication Data

US 2011/0223504 A1     Sep. 15, 2011

Related U.S. Application Data

(62) Division of application No. 10/592,671, filed as application No. PCT/JP2005/022746 on Dec. 12, 2005, now abandoned.

(30) Foreign Application Priority Data

Dec. 28, 2004  (JP) ................................. 2004-378967

(51) Int. Cl.
 *H01M 8/04*  (2006.01)
(52) U.S. Cl. .......................... 429/428; 429/422; 429/400
(58) Field of Classification Search .................. 429/422, 429/400, 428
 See application file for complete search history.

(56) References Cited

U.S. PATENT DOCUMENTS

| | | |
|---|---|---|
| 6,492,043 B1 | 12/2002 | Knights |
| 2003/0008185 A1 | 1/2003 | Sugino |

FOREIGN PATENT DOCUMENTS

| | | |
|---|---|---|
| JP | 08138713 | 5/1996 |
| JP | 08329965 | 12/1996 |
| JP | 09027336 | 1/1997 |
| JP | 11097049 | 4/1999 |
| JP | 11224681 | 8/1999 |
| JP | 2003-017094 | 1/2003 |
| JP | 2004-127548 | 4/2004 |
| JP | 2004-139842 | 5/2004 |
| JP | 2004-158312 | 6/2004 |
| JP | 2004-192919 | 7/2004 |

OTHER PUBLICATIONS

PCT International Search Report dated Mar. 28, 2006.

*Primary Examiner* — Jane Rhee
(74) *Attorney, Agent, or Firm* — Dickinson Wright PLLC

(57) ABSTRACT

A fuel cell system comprising: a fuel cell 1 having a fuel gas passage 1D and an oxidizing gas passage 1E; a fuel gas feeder 2; an oxidizing gas feeder 3; a fuel gas exhaust passage 8; an oxidizing gas exhaust passage 9; a test gas feeder 20 configured to feed a test gas to either the fuel gas passage 1D or the oxidizing gas passage 1E; a flow rate detector 5 configured to detect the flow rate of the test gas; a first passage blocking device 4; and a controller 10,
 wherein said controller 10 controls said first passage blocking device 4 to block off the passage and controls the test gas feeder 2 to feed the test gas to said fuel cell 1, thereby obtaining a detected value from the flow rate detector 5 or an airtightness value that is numerical information into which the detected value is converted.

14 Claims, 7 Drawing Sheets

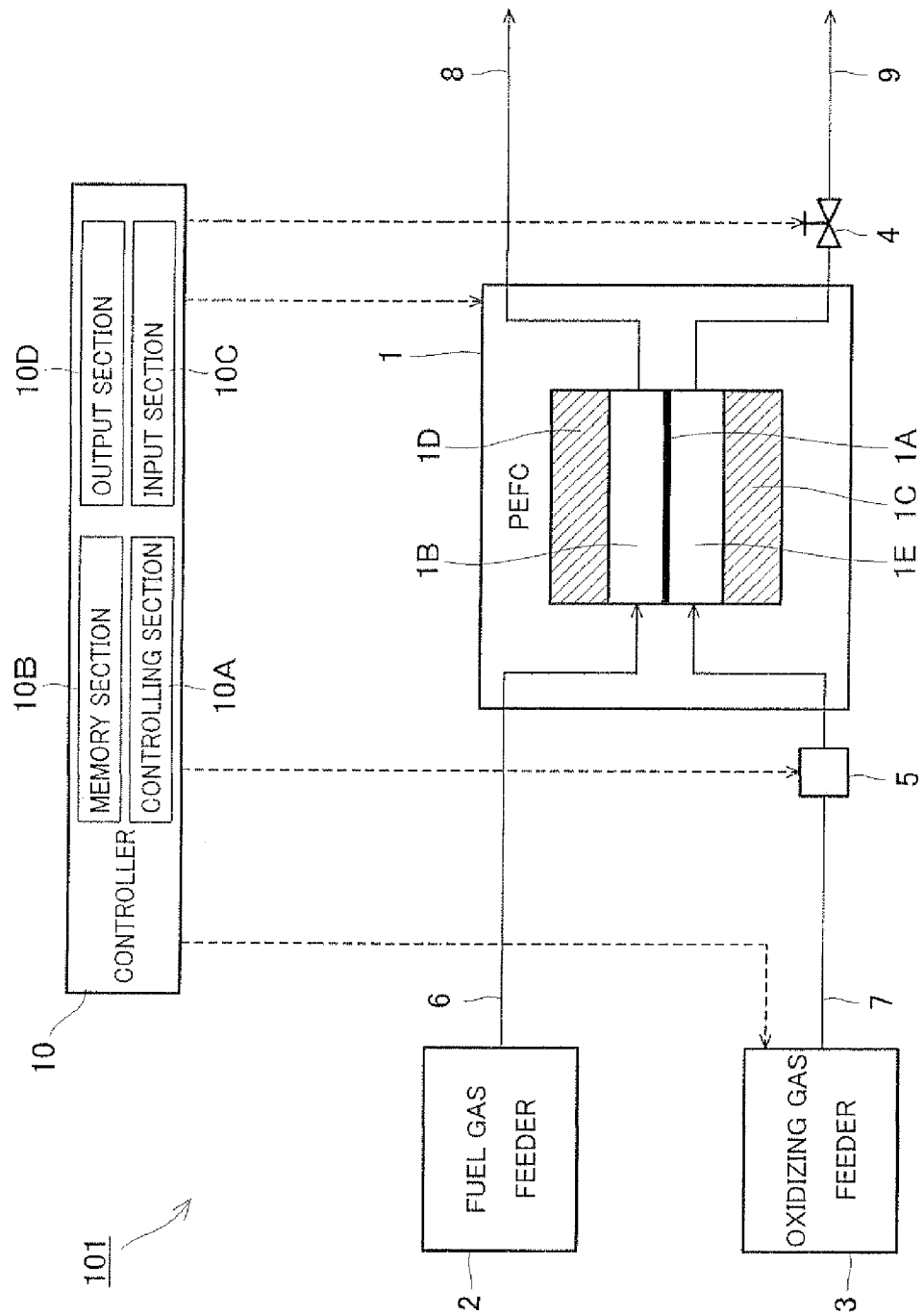

FUEL CELL SYSTEM

This is a divisional application of application Ser. No. 10/592,671 filed Sep. 13, 2006, which is a national stage of PCT/JP2005/022746 filed Dec. 12, 2005, which is based on Japanese Application No. 2004-378967 filed Dec. 28, 2004, the entire contents of each which are incorporated by reference herein.

TECHNICAL FIELD

The present invention relates to a fuel cell system adapted for use in portable power supplies, power supplies for electric vehicles, cogeneration systems and others. More particularly, the present invention relates to a fuel cell system equipped with a fuel cell having polymer electrolyte membranes.

BACKGROUND ART

Fuel cells are designed to cause an electrochemical reaction between a fuel gas containing hydrogen and an oxidizing gas containing oxygen such as air, thereby simultaneously generating electric power and heat. As an example of fuel cells, there are known polymer electrolyte fuel cells having the following structure.

A catalytic reaction layer containing carbon powder which carries a platinum group metal catalyst as a chief component is formed on both sides of a polymer electrolyte membrane, for selectively transporting hydrogen ions. On the outer face of each catalytic reaction layer, a diffusion layer is formed which is made of, for example, carbon paper or carbon cloth having both fuel gas permeability and electronic conductive properties. These diffusion layers and catalytic reaction layers are combined thereby forming a membrane electrode assembly.

For power collection, this membrane electrode assembly is sandwiched by separators made from conductive materials such as glass-like carbon or metal. These separators are provided with gas passages that are formed so as to expose the aforesaid fuel gas and oxidizing gas to the membrane electrode assembly and with cooling fluid passages that are formed so as to control the temperature of the membrane electrode assembly, in other words, so as to recover the heat generated together with electric power. Generally, a gas sealing material or gasket is provided between the membrane electrode assembly and each separator, for preventing leakage of the supplied fuel gas and oxidizing gas to the outside and mingling of these gases.

The membrane electrode assembly sandwiched between the separators serves as a basic unit. In a polymer electrolyte fuel cell, such membrane electrode assemblies are stacked in numbers corresponding to the design output of electric power or heat of the polymer electrolyte fuel cell.

In a fuel cell system, a fuel gas feeder for supplying the fuel gas and an oxidizing gas feeder for supplying the oxidizing gas are connected to the polymer electrolyte fuel cell (hereinafter abbreviated as PEFC). In addition, there are provided, according to need, an exhaust heat recovery system for recovering generated heat and a power converting system for making the electric power generated in the PEFC usable. Further, a control unit for controlling these systems is provided.

The fuel gas feeder includes a hydrogen generator for generating a hydrogen-rich gas (i.e., the fuel gas) by reforming hydrocarbon fuel such as natural gas, propane gas and gasoline to output to the PEFC. The oxidizing gas feeder consists of, for example, a blower or fan and supplies air to the PEFC as the oxidizing gas. In some cases, the fuel gas feeder and oxidizing gas feeder are equipped with a humidifier for controlling the amount of moisture contained in the fuel gas or oxidizing gas to be supplied to the PEFC. The exhaust heat recovery system is composed of a heat exchanger and a hot water tank. The heat exchanger recovers the heat retained by, for instance, the cooling fluid flowing in the cooling fluid passage by means of water to produce hot water. The hot water tank stores this hot water. The power converting system includes an inverter for converting a dc power generated by the PEFC into an ac power and a transformer.

As described earlier, within the PEFC, the fuel gas or oxidizing gas flows in the route made by the gas passages formed in the gasket, polymer electrolyte membrane and separators. However, the constituents of the gas passages degrade causing, for instance, increases in the gas permeation of the polymer electrolyte membrane and hardening of the gasket, so that the airtightness of the gas passages decreases. This entails leakage of the fuel gas or oxidizing gas to the outside or mingling of these gases. The leakage of the fuel gas to the outside and the mingling of the fuel gas/the oxidizing gas may trigger off abnormal combustion or an explosion. Even if they do not result in abnormal combustion or an explosion, the leakage to the outside causes an insufficient supply of the fuel gas or oxidizing gas to the catalyst reaction layer and, in consequence, insufficient exposure of the gas to the membrane electrode assembly. As a result, the polarization resistance of the electrode reaction increases with a decrease in the output of the PEFC.

To prevent damage to the PEFC and a decrease in the performance of the fuel cell, a fuel cell system or detection method is required which enables detection of the airtightness of the passages in which the fuel gas or oxidizing gas flows. General type pressure vessels usually employ "escape probability detection" in which pressure gas is sealed in a vessel and the time taken for pressure to decrease or a decrease in pressure within a specified period of time is detected. However, the detection method, in which pressurized gas is sealed in a fuel cell system and the progress of decreasing of pressure is observed, can not be practically applied to fuel cell systems, because they are operated as needed and therefore detection of the airtightness of the passages for the fuel gas or oxidizing gas in the PEFC has to be promptly performed so as not to hinder the operation of the PEFC. Apart from the above method, there have been heretofore proposed several fuel cell systems and methods for detecting the airtightness of a fuel cell. Typical techniques are as follows.

In the fuel cell system disclosed in Patent Document 1, the consumption of the fuel gas is calculated based on the output current of the fuel cell and the pressure of the fuel gas within the fuel gas cylinder is calculated from the fuel gas consumption. Then, the presence/absence of fuel gas leakage is determined from a comparison between this calculated pressure value and a detected pressure value that is obtained from actual detection with a pressure sensor.

According to the diagnosis method disclosed in Patent Document 2, a hydrogen-containing gas and an oxygen-containing gas are supplied to the fuel electrode and oxidant electrode, respectively, of the fuel cell and a rapid change in the generated voltage of the fuel cell caused by a decrease in the supply of the oxygen-containing gas is detected. Then, the leakage of hydrogen in the fuel cell is calculated from the relationship between the oxygen-containing gas and the generated voltage.

There have been proposed fuel cell systems that make a judgment on deterioration of a fuel cell. According to this technique, the condition of a fuel cell is detected in various ways thereby determining whether or not the fuel cell has deteriorated and the result of the determination is fed back to the control mechanism for the fuel cell to restrain the progression of the deterioration so that the durability and service life of the fuel cell and the fuel cell system are increased.

For instance, Patent Document 3 discloses a PEFC operating method according to which a judgment is made to check whether the operational state of the PEFC is in a performance decreasing zone by analyzing impurity ions contained in the moisture of a fuel gas humidifying water or the like from the PEFC. If it is determined that the operational state is in the performance decreasing zone, the operation of the PEFC is brought to a stop or operating conditions for the PEFC are limited, thereby making the operational state of the PEFC get out of the performance decreasing zone.

Patent Document 4 discloses a method of estimating the service life of a fuel cell. According to this method, a fuel cell is operated in several basic operating patterns and its service life is estimated based on the time taken for power generation and the change rate of output voltage in each basic operation pattern.

Patent Document 1: Japanese Laid-Open Patent Application Publication No. Hei 11-224681
Patent Document 2: Japanese Laid-Open Patent Application Publication No. Hei 9-27336
Patent Document 3: Japanese Laid-Open Patent Application Publication No. 2004-127548
Patent Document 4: Japanese Laid-Open Patent Application Publication No. Hei 11-97049

DISCLOSURE OF THE INVENTION

Problems that the Invention is to Solve

Incidentally, in a fuel cell, the vapor contained in the gas supplied to the fuel cell becomes flocculated water in the oxidizing gas passage or fuel gas passage and this water dwells in the oxidizing gas passage or fuel gas passage, hampering a flow of the gas, which results in a decrease in the output of the fuel cell. To prevent this, it is usual to perform purging treatment in which the residual gas or moisture remaining in the fuel cell is purged in the course of the start-up, stop or operation of the fuel cell. In a purging technique, a dried fuel gas, for instance, is supplied to the fuel cell thereby forcing the flocculated water out of the fuel cell. Therefore, the fuel cell system disclosed in Patent Document 1 has the disadvantage that where a fuel gas is used for the purging of the residual gas or water from the fuel cell, the consumption of the fuel gas used for the purging treatment is counted in the measurement of leakage so that the accuracy of the detection of leakage in the fuel cell decreases.

In the diagnosis method disclosed in Patent Document 2, the generated voltage of the fuel cell is measured while gradually reducing the amount of oxygen-containing gas supplied to the cathode, yet changes in the generated voltage measured according to changes in the supply of the gas are so small that this method has much to do with detection accuracy. In addition, various factors such as decreasing electrode performance are involved with fluctuations in the output electric power of a fuel cell. In view of this, the method of estimating the leakage of the fuel gas based on voltage generation has left room for improvements in accuracy.

In a PEFC, fluoride ions are generated when the polymer electrolyte membrane decomposes. Fluoride ions are strongly acidic and therefore corrode metals. The PEFC operating method disclosed in Patent Document 3 utilizes this phenomena and determines deterioration of a PEFC by detecting ions such as metal ions in moisture such as produced water and humidifying water. However, physical damage to the polymer electrolyte membrane also causes a decrease in the airtightness of the passage for the fuel gas or oxidizing gas in a PEFC. When the polymer electrolyte membrane gets such damage, generation of metal ions or fluoride ions are unlikely to occur. Therefore, the method of determining deterioration of a PEFC from detection of metal ions or fluoride ions is not suited for detection of the airtightness of a PEFC and, more precisely, the airtightness of the passage where the fuel gas or oxidizing gas flows.

The catalytic power of the electrode catalyst (e.g., platinum) of a fuel cell is affected by various environmental conditions such as load fluctuations in the fuel cell, the gas components contained in the fuel cell, the partial pressure of the gas components of the fuel cell and temperature/humidity conditions during suspension. Specifically, the electrode surface area of a fuel cell varies according to the history of the fuel cell and in fact, it is difficult to estimate the service life of a fuel cell with high accuracy from the operating patterns of the fuel cell. Therefore, the estimation of the service life of a fuel cell by approximating it from one or plural basic operation patterns of the fuel cell has left room for improvements.

As described above, the prior art techniques have proved unsuccessful in providing satisfactory accuracy in quick detection of the airtightness of the passage of the fuel cell where the fuel gas or oxidizing gas flows and therefore left room for improvements. Regarding the judgment on the deterioration of a fuel cell, the acquisition of the basic operating patterns of a fuel cell requires much time and labor and the provision of a special apparatus such as a detector for detecting metal ions or fluoride ions incurs additional costs.

The invention is directed to overcoming the above problems and a primary object of the invention is therefore to provide a fuel cell system that is constructed in simple structure and capable of promptly, accurately detecting the airtightness of a fuel cell as a deterioration information of a fuel cell.

Means of Solving the Problems

In accomplishing the above object, there has been provided, in accordance with a first aspect of the invention, a fuel cell system comprising:

a fuel cell having a fuel gas passage and an oxidizing gas passage which are so formed as to be in contact with an anode and a cathode respectively, the anode and the cathode being formed on opposed sides of a polymer electrolyte membrane respectively;

a fuel gas feeder configured to feed a fuel gas to the fuel gas passage;

an oxidizing gas feeder configured to feed an oxidizing gas to the oxidizing gas passage;

a fuel gas exhaust passage configured to flow an excessive fuel gas discharged from the fuel gas passage;

an oxidizing gas exhaust passage configured to flow an excessive oxidizing gas discharged from the oxidizing gas passage;

a test gas feeder configured to feed a test gas to either the fuel gas passage or the oxidizing gas passage;

a flow rate detector configured to detect a flow rate of the test gas;

a first passage blocking device configured to block off either the fuel gas exhaust passage or the oxidizing gas exhaust passage to which the test gas is fed; and a controller;

wherein the controller controls the first passage blocking device to block off the passage and controls the test gas feeder to feed the test gas to the fuel cell, thereby obtaining a detected value from the flow rate detector or an airtightness value that is numerical information into which the detected value is converted. The fuel cell system of the above structure can promptly, accurately detect the airtightness of the fuel cell as a deterioration information of the fuel cell by the simplified structure and operation of the flow rate detector, the passage blocking device and the test gas feeder.

According to a second aspect of the invention, the test gas feeder of the fuel cell system may be either the fuel gas feeder or the oxidizing gas feeder. In this arrangement, the test gas feeder can be eliminated, which enables prompt, accurate detection of the airtightness of the fuel cell with a more simplified structure and operation.

According to a third aspect of the invention, the fuel cell system may further comprise a second passage blocking device configured to block off a gas passage connected to an outlet side of either the fuel gas passage or the oxidizing gas passage which is not fed with the test gas; and a third passage blocking device configured to block off a gas passage connected to an inlet side of either the fuel gas passage or the oxidizing gas passage which is not fed with the test gas, wherein the controller controls the first to third passage blocking devices to block off their associated passages, thereby obtaining a first airtightness value of the flow rate detector; controls the first passage blocking device to block off its associated passage while controlling the second and third passage blocking devices so as not to block off either of their associated passages, thereby obtaining a second airtightness value of the flow rate detector; and obtains a difference between the first airtightness value and the second airtightness value. The fuel cell system of this structure can obtain leakage from the fuel gas passage to the oxidizing gas passage and therefore can perform prompt, accurate detection of the airtightness of the fuel cell and more particularly the degree of damage to the polymer electrolyte membrane with a more simplified structure and operation.

According to a fourth aspect of the invention, the test gas feeder of the fuel cell system may be either the fuel gas feeder or the oxidizing gas feeder. In this arrangement, the test gas feeder can be eliminated, which enables prompt, accurate detection of the airtightness of the fuel cell with a more simplified structure and operation.

According to a fifth aspect of the invention, there is provided a fuel cell system in which the test gas may be composed of chemical components that do not cause a chemical reaction within the fuel cell. This prevents damages in the fuel cell such as decrease of the catalytic power by the test gas.

With a view to ensuring the effects of the invention described above, there is provided a fuel cell system according to a sixth aspect of the invention in which the test gas may contain at least one selected from a group consisting of fuel gas, oxidizing gas, inactive gas, carbon dioxide and methane mixed gas.

According to a seventh aspect of the invention, the controller of the fuel cell system may have an output section for outputting the airtightness value to outside. With this arrangement, the user of the fuel cell system can quickly accurately obtain the degree of airtightness of the fuel cell so that a damage to the fuel cell system and a decrease in its performance can be prevented beforehand.

According to an eighth aspect of the invention, the controller of the fuel cell system may have a memory section for prestoring reference airtightness values for evaluation of the airtightness value, and the controller makes a comparison between the airtightness value and the reference airtightness values thereby evaluating the airtightness of the fuel cell. This enables the fuel cell system to use the reference airtightness values as a criterion of judgment so that the condition of the fuel cell in terms of airtightness can be properly evaluated.

According to a ninth aspect of the invention, the controller of the fuel cell system may have an output section for outputting the airtightness value which has been evaluated to outside. With this arrangement, the user of the fuel cell system can obtain the result of the evaluation of the airtightness of the fuel cell so that he can easily consider and implement measures to prevent damage to the fuel cell system and a decrease in its performance.

According to a tenth aspect of the invention, the controller of the fuel cell system may adjust operating conditions for the fuel cell based on the evaluated airtightness value. This makes the fuel cell system automatically prolong the service life of the fuel cell, using the reference airtightness values as a criterion of judgment.

According to an eleventh aspect of the invention, the controller of the fuel cell system may obtain the airtightness value at specified detection time intervals and accumulatively stores the obtained airtightness values in the memory section in relation to an operating time of the fuel cell; and wherein the controller obtains a transition line of the airtightness values relative to the operating time by a statistical approximation method and estimates a deterioration in the airtightness of the fuel cell based on a comparison between the transition line and the reference airtightness values. This enables the fuel cell system to promptly accurately detect the airtightness of the fuel cell and predict the service life of the fuel cell system, with a simplified structure and operation.

According to a twelfth aspect of the invention, the controller of the fuel cell system may alter the detection time intervals according to a locus of the transition line. This makes it possible to eliminate operation for obtaining unnecessary detected airtightness values without affecting the acquisition of the transition line of detected airtightness values, so that the operation of the fuel cell system can be rationalized.

According to a thirteenth aspect of the invention, the reference airtightness values stored in the memory section of the controller of the fuel cell system may include a limit airtightness value representative of a service limit of the fuel cell; and wherein the controller extrapolates the transition line to obtain an estimated remaining operation time of the fuel cell left before the transition line reaches the limit airtightness value. This enables the fuel cell system to estimate a service life of the fuel cell system based on concrete numerical information.

According to a fourteenth aspect of the invention, the controller of the fuel cell system may have an output section for outputting the estimated remaining operation time to outside. This enables the user of the fuel cell system to obtain concrete numerical information on the remaining service life of the fuel cell, so that he can preliminarily consider countermeasures against damage to the fuel cell system and a decrease in its performance, can select a proper operation mode of the fuel cell and can make an operation schedule for the fuel cell.

According to a fifteenth aspect of the invention, the controller of the fuel cell system may adjust operating conditions for the fuel cell based on the estimated remaining operation time. In this fuel cell system, the service life of the fuel cell can be substantially automatically prolonged so that the burden imposed on the user of the fuel cell system in terms of operation management can be reduced.

According to a sixteenth aspect of the invention, the controller of the fuel cell system may obtain the detected value or the airtightness value when starting up and/or stopping the operation of the fuel cell. This enables the fuel cell system to substantially automatically detect the airtightness of the fuel cell.

These objects as well as other objects, features and advantages of the invention will become apparent to those skilled in the art from the following description with reference to the accompanying drawings.

Effects of the Invention

The fuel cell system of the invention has the effect of promptly accurately detecting the airtightness of the fuel cell, with a simple structure.

BRIEF DESCRIPTION OF THE DRAWINGS

FIG. 2 is graphs each conceptually showing a transition line of a detected airtightness value relative to the operating time of a PEFC, wherein

FIG. 3 is a schematic diagram illustrating a fuel cell system according to a second embodiment of the invention.

EXPLANATION OF REFERENCE NUMERALS

Figure 1:
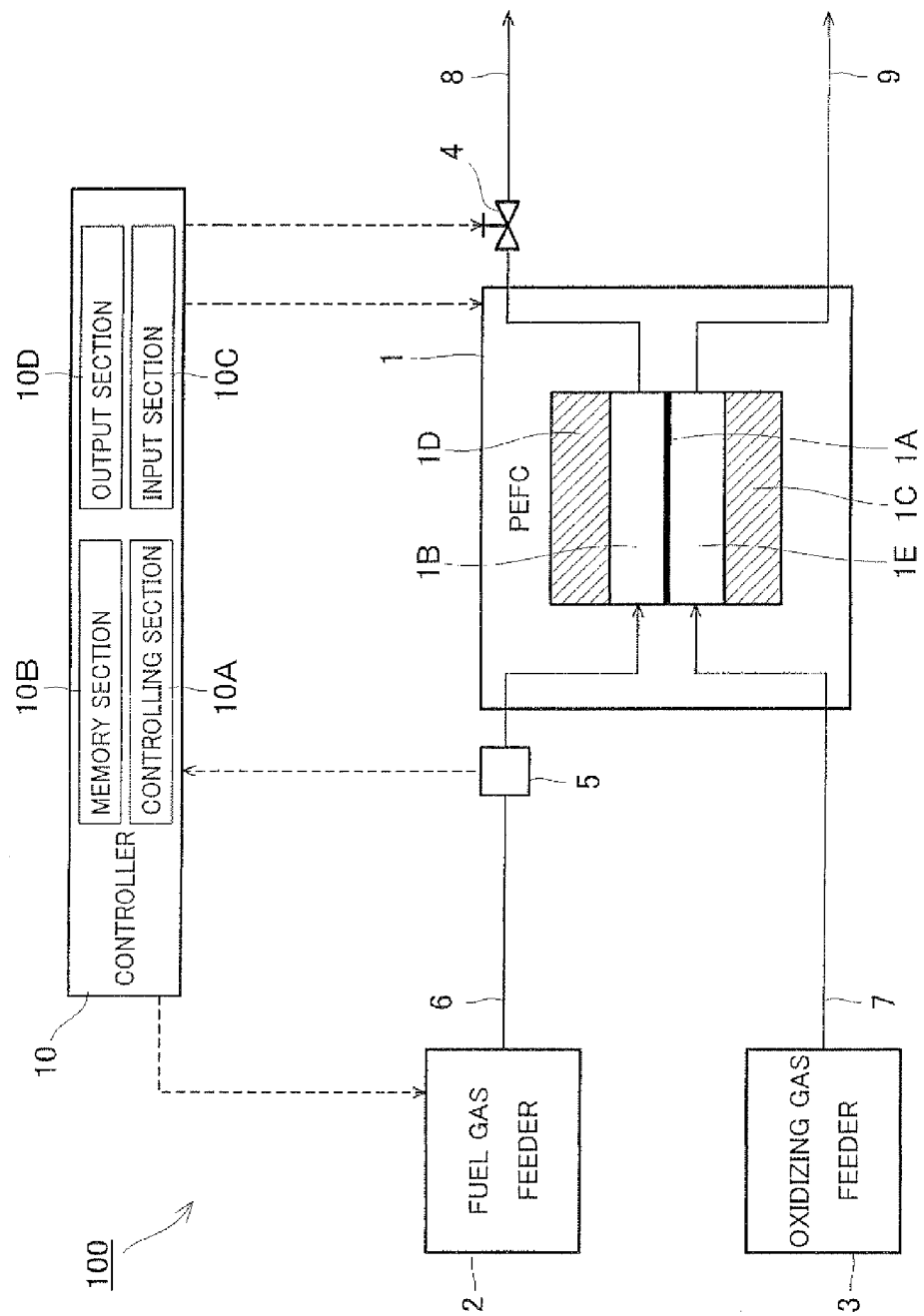
FIG. 1 is a schematic diagram illustrating a fuel cell system according to a first embodiment of the invention.

1: polymer electrolyte fuel cell (PEFC)
1A: membrane electrode assembly
1B: anode separator
1C: cathode separator
1D: fuel gas passage
1E: oxidizing gas passage
2: fuel gas feeder
3: oxidizing gas feeder
4: passage blocking device (first passage blocking device)
5: flow rate detector
6: fuel gas feeding passage
6A: fuel gas feeder side portion
6B: PEFC1 side portion
7: oxidizing gas feeding passage
8: fuel gas exhaust passage
9: oxidizing gas exhaust passage
10: controller
10A: controlling section
10B: memory section
10C: input section
10D: output section
20: test gas feeder
21: switching device
22: test gas passage
31: second passage blocking device
32: third passage blocking device
100, 101: fuel cell system
T: operating time
Q: airtightness value
$\Delta t$: detection time interval
$\Delta t_0$: estimated remaining operating time
$Q_0$: limit airtightness value
$Q_{100}$: initial airtightness value

BEST MODE FOR CARRYING OUT THE INVENTION

Referring now to the accompanying drawings, the fuel cell system and operation method of the invention will be hereinafter described in detail according to preferred embodiments. In the following description, those parts that are substantially equivalent or function substantially similarly to one another are indicated by the same numerals and redundant explanations are avoided.

First Embodiment

FIG. 1 is a schematic diagram illustrating a fuel cell system according to a first embodiment of the invention.

First of all, there will be explained the structure of the fuel cell system 100 according to the first embodiment.

The fuel cell system 100 has a fuel gas feeder 2 and an oxidizing gas feeder 3. The fuel gas feeder 2 is connected to a fuel gas feeding passage 6 whereas the oxidizing gas feeder 3 is connected to an oxidizing gas feeding passage 7.

The fuel gas feeding passage 6 is connected to a polymer electrolyte fuel cell (hereinafter referred to as "PEFC") 1, and a fuel gas is supplied from the fuel gas feeder 2 to the PEFC1. The oxidizing gas feeding passage 7 is connected to the PEFC 1, and an oxidizing gas is supplied from the oxidizing gas feeder 3 to the PEFC1.

The fuel gas feeding passage 6 is provided with a flow rate detector 5. The flow rate detector 5 is constituted by, for instance, a flowmeter and detects the flow rate of a fluid that flows in a target passage that is the fuel gas feeding passage 6 herein.

In the PEFC1, a membrane electrode assembly 1A is sandwiched between a pair of separators, namely, an anode separator 1B and a cathode separator 1C. A fuel gas passage 1D is defined by the membrane electrode assembly 1A and a groove formed on the surface of the anode separator 1B. Similarly, an oxidizing gas passage 1E is defined by the membrane electrode assembly 1A and a groove formed on the surface of the cathode separator 1C. Within the PEFC1, the fuel gas passage 1D and the oxidizing gas passage 1E are accordingly separated from each other by the membrane electrode assembly 1A having a polymer electrolyte membrane.

The fuel gas feeding passage 6 is connected to one end of the fuel gas passage 1D to supply the fuel gas to the fuel gas passage 1D. The oxidizing gas feeding passage 7 is connected to one end of the oxidizing gas passage 1E to supply the oxidizing gas to the oxidizing gas passage 1E. The fuel gas and oxidizing gas, which are supplied to the fuel gas passage 1D and oxidizing gas passage 1E respectively, cause a chemical reaction, thereby generating electric power and heat.

A fuel gas exhaust passage 8 is connected to the other end of the fuel gas passage 1D. The redundant fuel gas, which has not chemically reacted in the anode, is discharged from the other end of the fuel gas passage 1D to the fuel gas exhaust passage 8. An oxidizing gas exhaust passage 9 is connected to the other end of the oxidizing gas passage 1E. The redundant oxidizing gas, which has not chemically reacted in the cathode, is discharged from the other end of the oxidizing gas passage 1E to the oxidizing gas exhaust passage 9.

The fuel gas exhaust passage 8 is provided with a passage blocking device 4. The passage blocking device 4 is configured to block off a flow of fluid in a target passage that is the fuel gas exhaust passage 8 herein. In this embodiment, the passage blocking device 4 has an electric-operated valve whose valve disc blocks the passage.

The fuel cell system 100 has a controller 10. The controller 10 has a controlling section 10A that is constituted by a controlling member such as micro computers; a memory section 10B that is constituted by a storing member such as memories; an input section 10C that is constituted by an input unit such as key boards and touch panels; and an output section 10D that is constituted by an output unit such as monitors. The controller 10 controls the operation of the fuel cell system 100. More particularly, the controller 10 controls the passage blocking device 4 and a raw material gas feeder 14 to obtain a detected value with the flow rate detector 5.

The memory section 10B stores reference airtightness values used for evaluation of the airtightness of the PEFC1. Specifically, an initial airtightness value $Q_{100}$ of the PEFC1 in the initial (starting) stage of the operation; a limit airtightness value $Q_0$ of the PEFC1 in the stage where a functional disturbance appears in the PEFC 1 (i.e., in the service limit stage); and intermediate airtightness values $Q_{80}$, $Q_{60}$, $Q_{40}$, $Q_{20}$ which are intermediate values between the initial airtightness value $Q_{100}$ and the limit airtightness value $Q_0$ are input through the input section 10D and stored in the memory section 10B beforehand.

The airtightness value Q is numerical information such as a detected value (e.g., a current signal value and a voltage signal value) obtained by the flow rate detector 5 or numerical information such as a flow rate value obtained by converting the detected value. The airtightness value Q is used as deterioration information indicative of the degree of deterioration of the PEFC1.

The meaning of the controller as stated herein does not only indicate a single controller but includes a controller group consisting of a plurality of controllers that cooperate with one another to execute control. Therefore, the controller 10 is not necessarily constituted by a single controller but may be constituted by a plurality of controllers that are disposed at discrete positions so as to control the operation of the fuel cell system 100 in cooperation with one another. For instance, the output section 10D may be designed such that its output is transmitted by a data terminal so as to be displayed on a mobile device.

Next, the airtightness value detecting operation of the fuel cell system 100, which is one of the features of the invention, will be explained. This airtightness value detecting operation is performed, being controlled by the controller 10.

While the oxidizing gas feeder 3 is in a stopped state, the controller 10 first controls the passage blocking device 4 to block off the fuel gas exhaust passage 8 and controls the fuel gas feeder 2 to supply the fuel gas at constant pressure. For example, in either or both of the start-up operation and stop operation of the PEFC1, the controller 10 executes the airtightness value detecting operation of the fuel cell system 100. Thereby, the airtightness of the PEFC1 can be substantially automatically detected.

If gas leakage occurs in the PEFC1, the fuel gas feeder 2 will continue to supply the fuel gas to the PEFC1. Then, the flow rate detector 5 detects the flow rate of the fuel gas. In accordance with a detected value of the flow rate detector 5, the controller 10 obtains an airtightness value based on a detected value of the flow rate detector 5, i.e., a detected airtightness value Q. If no fuel gas leakage occurs, the flow of the fuel gas can be substantially shut off by blocking off the fuel gas exhaust passage 8. Accordingly, the presence/absence of leakage of the fuel gas can be checked, in other words, the degree of airtightness can be evaluated within a short time. Since the precision of the flow rate detector 5 (flow rate detection capability) is high enough to detect fuel gas leakage in the PEFC1, high accuracy gas leakage detection can be ensured.

As a result, the fuel cell system 100 can promptly, accurately detect the airtightness of the PEFC1 with the simplified structure and operation of the flow rate detector 5, the passage blocking device 4 and the fuel gas feeder 2.

The controller 10 displays the detected airtightness value Q on the output section 10D. Thereby, the user of the fuel cell system 100 can promptly accurately grasp the airtightness condition of the PEFC1, i.e., the degree of deterioration, so that damage to the fuel cell system 100 and a decrease in its performance can be prevented beforehand.

The controller 10 makes, in the controlling section 10A, a comparison between the detected airtightness value Q and the reference airtightness values $Q_{100}$ to $Q_0$ stored in the memory section 10B, thereby evaluating the condition of the airtightness of the PEFC1 to display. More concretely, one of the reference airtightness values $Q_{100}$ to $Q_0$ that is the closest to the detected airtightness value Q and the difference between the detected airtightness value Q and the closest one of the reference airtightness values $Q_{100}$ to $Q_0$ are obtained and displayed on the output section 10D. In such an evaluation, the fuel cell system 100 uses the reference airtightness values $Q_{100}$ to $Q_0$ as a criterion of judgment so that the condition of the fuel cell in terms of airtightness can be properly evaluated. Further, since the result of the evaluation of the airtightness of the PEFC 1 is displayed and therefore the user of the fuel cell system 100 is informed of it, the user can more easily take countermeasures against damage to the fuel cell system 100 and a decrease in its performance.

Additionally, the controller 10 adjusts operating conditions for the fuel cell system 100 according to the comparative evaluation of the detected airtightness value Q by use of the reference airtightness values $Q_{100}$ to $Q_0$. For instance, whenever the detected airtightness value Q sequentially reaches the intermediate airtightness values $Q_{80}$, $Q_{60}$, $Q_{40}$, $Q_{20}$, starting from the initial airtightness value $Q_{100}$, the controller 10 lowers the upper limit of the loss of the supply pressure of the oxidizing gas and fuel gas between the outlet and inlet of the PEFC1 during the operation period of the fuel cell system 100, thereby controlling the oxidizing gas feeder 3 and the fuel gas feeder 2 so as to operate, restricting the pressure loss. Thereby, the fuel cell system 100 can substantially automatically prolong its service life, using the reference airtightness values $Q_{100}$ to $Q_0$ as a threshold, that is, a criterion of judgment.

Next, there will be explained the service life estimation operation of the fuel cell system 100 in which the airtightness value Q is used as deterioration information.

First, the controlling section 10A of the controller 10 controls the fuel cell system 100, using a built-in clock so as to perform the airtightness value detecting operation at specified detecting time intervals Δt. The specified detecting time interval Δt is a time interval based on the operating time of the PEFC1. The controller 10 accumulatively stores the detected airtightness values Q in correspondence with the operating time T of the PEFC1 that elapses before the airtightness value detecting operation is done. If the fuel cell 1 is in operation at the scheduled time of the airtightness value detecting operation, the controller 10 performs the airtightness value detecting operation in the nearest stop operation of the fuel cell 1.

The controller 10A obtains a transition line of the detected airtightness value Q relative to the operating time T based on the accumulated detected airtightness values Q, using a statistical approximation method. For example, this transition line may be obtained by making use of a statistical processing method such as a least square method. The controller section 10A estimates future changes in the detected airtightness value Q. The future changes may be estimated, for instance, by extrapolating the transition line.

Figure 2A:
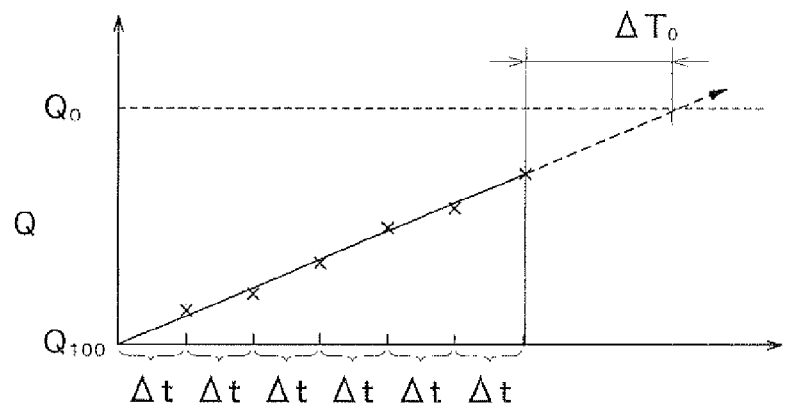
FIG. 2(a) is a graph showing a case where the detected airtightness value varies at a constant pace.
Figure 2B:
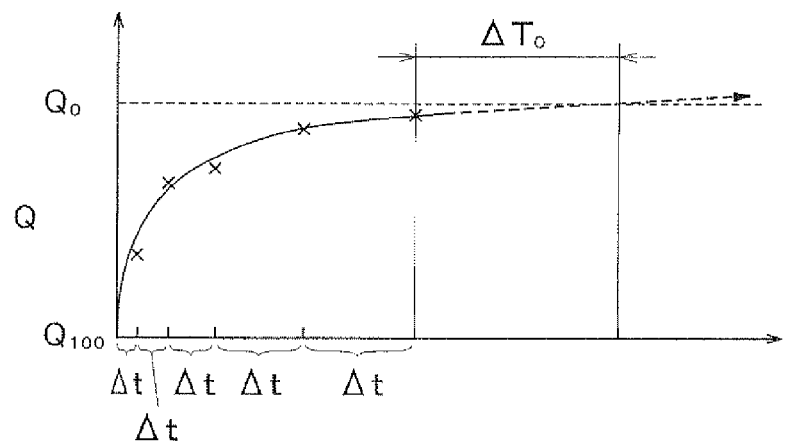
FIG. 2(b) is a graph showing a case where the detected airtightness value varies so as to gradually become stable.
Figure 2C:
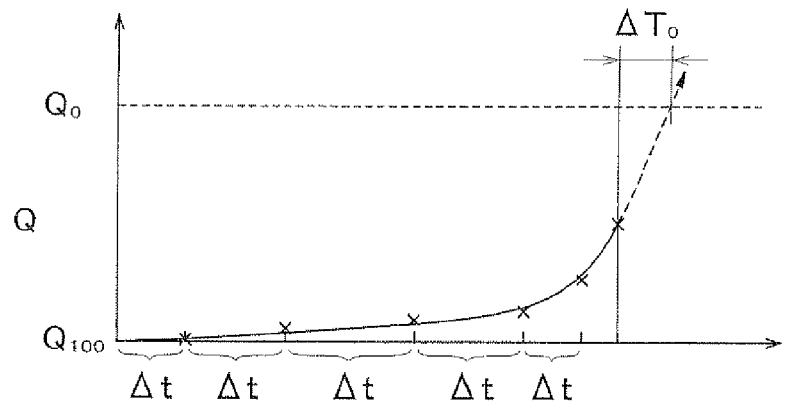
FIG. 2(c) is a graph showing a case where the change of the detected airtightness value gradually becomes significant.

Herein, FIG. 2 is graphs each conceptually showing a transition line of the detected airtightness value relative to the operating time of the PEFC, wherein FIG. 2(a) is a graph showing a ease where the detected airtightness value varies at a constant rate, FIG. 2(b) is a graph showing a case where the detected airtightness value varies so as to gradually become stable, and FIG. 2(c) is a graph showing a case where the change of the detected airtightness value gradually becomes significant.

As seen from FIGS. 2(a) to 2(c), the controller 10A compares this transition line with the limit airtightness value $Q_0$ to calculate an estimated remaining operating time $\Delta T_0$, that is, an estimated time left before the PEFC1 reaches the limit airtightness value $Q_0$.

Accordingly, in the fuel cell system 100, the airtightness of the PEFC1 can be promptly accurately detected with the simplified structure and operation of the flow rate detector 5, the passage blocking device 4 and the fuel gas feeder 2 and the service life of the fuel cell system 100 can be estimated.

The controller 10 displays the estimated remaining operating time $\Delta T_0$ on the output section 10D. Since this enables the user of the fuel cell system 100 to obtain an evaluated value of the remaining service life of the PEFC1 in the form of concrete numerical information, the user can preliminarily consider countermeasures against damage to the fuel cell system 100 and a decrease in its performance, can select a proper operation mode of the PEFC1 and can make an operation schedule for the PEFC1.

The controlling section 10A of the controller 10 adjusts operating conditions for the PEFC1 based on the estimated remaining operating time $\Delta T_0$. For example, a life prolongation operation mode is selected and the oxidizing gas feeder 3, the fuel gas feeder 2 and the output power of the PEFC1 are controlled. In the life prolongation operation mode for instance, the controlling section 10A controls the oxidizing gas feeder 3 and the fuel gas feeder 2 such that the pressure loss of the oxidizing gas and the pressure loss of the fuel gas are equalized between the inlet and outlet of the PEFC1, or alternatively such that the supply pressure of the oxidizing gas and the fuel gas is suppressed thereby restricting the pressure losses of these gases between the inlet and outlet of the PEFC1. This enables substantially automatic prolongation of the service life of the fuel cell system 100 with the result that the burden imposed on the user of the fuel cell system 100 in terms of operation management can be reduced.

The controlling section 10A of the controller 10 alters the detecting time interval $\Delta t$ according to the locus of the transition line of the detected airtightness value Q relative to the operating time T. For example, as shown in FIG. 2(a), where the detected airtightness value Q transitions at a constant pace, $\Delta t$ is kept constant. As shown in FIG. 2(b), where the detected airtightness value Q changes so as to gradually become stable, $\Delta t$ is changed so as to increase gradually. As shown in FIG. 2(c), where the change of the detected airtightness value Q gradually becomes significant, $\Delta t$ is changed so as to decrease gradually. This makes it possible to eliminate operation for obtaining unnecessary detected airtightness values without affecting the acquisition of the transition line of the detected airtightness value Q, so that the operation of the fuel cell system 100 can be rationalized.

Second Embodiment

FIG. 3 is a schematic diagram illustrating a fuel cell system according to a second embodiment of the invention. In FIG. 3, the parts that are substantially equivalent or function similarly to those of FIG. 1 are identified with the same reference numerals as in FIG. 1, and an explanation of them is omitted in this embodiment.

The structure of the fuel cell system 101 of the second embodiment does not differ from that of the fuel cell system 100 of the first embodiment except that the flow rate detector 5 is provided not in the fuel gas feeding passage 6 but in the oxidizing gas feeding passage 7 and the passage blocking device 4 is provided not in the fuel gas exhaust passage 8 but in the oxidizing gas exhaust passage 9.

The airtightness value detecting operation of the fuel cell system 101 of the second embodiment does not differ from that of the fuel cell system 100 of the first embodiment except that the controller 10 controls the oxidizing gas feeder 3 in place of the fuel gas feeder 2.

When the fuel gas feeder 2 is in a stop state, the passage blocking device 4 is controlled to block off the oxidizing gas feeder 9 and the oxidizing gas feeder 3 is controlled to supply the fuel gas at constant pressure. Then, the controller 10 obtains the detected airtightness value Q based on the detected value of the flow rate detector 5.

The controller 10 controls the fuel cell system 101 based on the detected airtightness value Q so as to perform the airtightness value detecting operation and the service life estimating operation similarly to the first embodiment.

In the fuel cell system 101, the airtightness of the PEFC1 is accordingly detected using not the fuel gas but the oxidizing gas, so that the risk of damage to the fuel cell system 101 owing to abnormal combustion of the fuel gas during the airtightness value detecting operation can be avoided.

Third Embodiment

Figure 4:
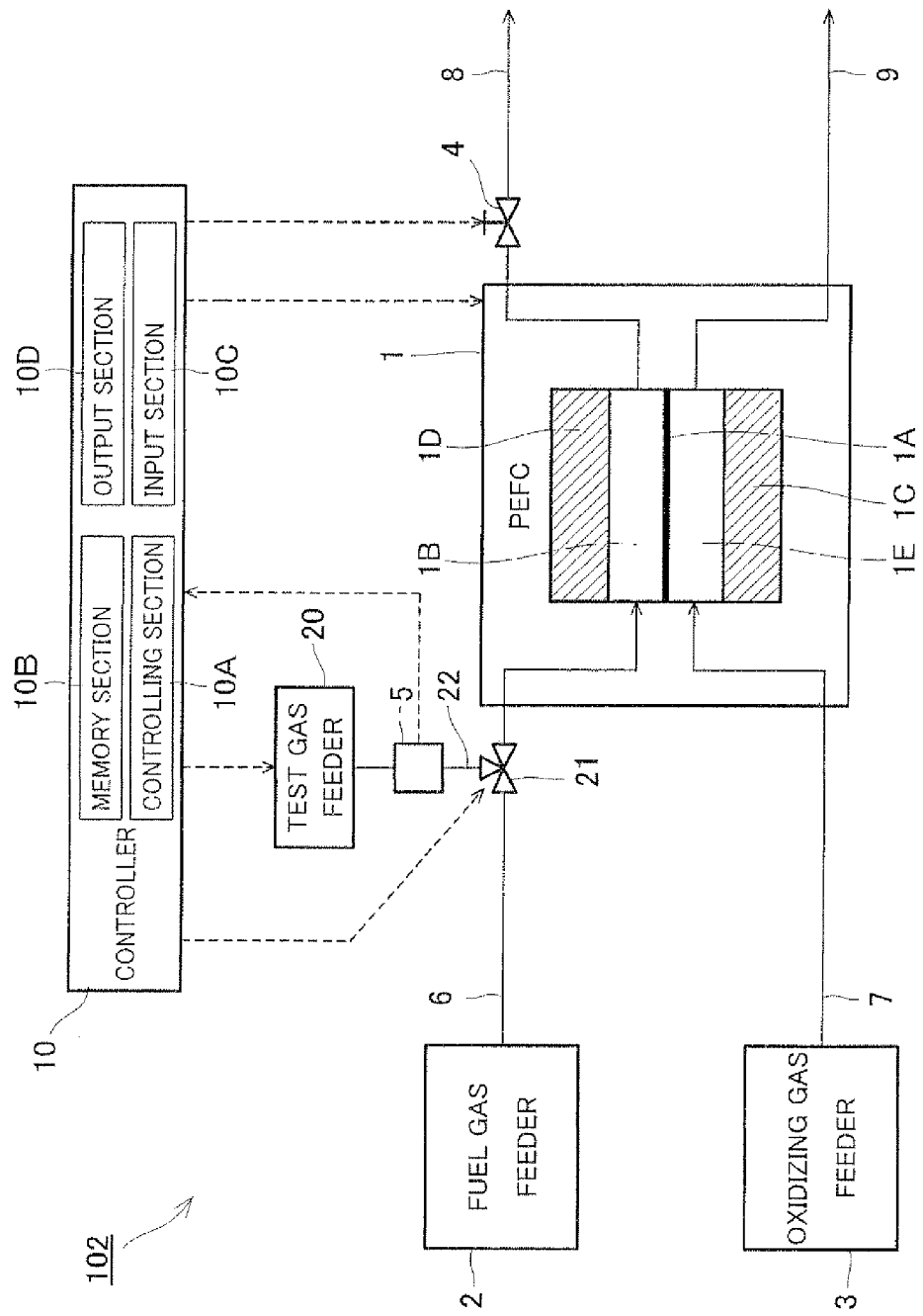
FIG. 4 is a schematic diagram illustrating a fuel cell system according to a third embodiment of the invention.

FIG. 4 is a schematic diagram illustrating a fuel cell system according to a third embodiment of the invention, In FIG. 4, the parts that are substantially equivalent or function similarly to those of FIG. 1 are identified with the same reference numerals as in FIG. 1, and an explanation of them is omitted in this embodiment.

The structure of the fuel cell system 102 of the third embodiment does not differ from that of the fuel cell system 100 of the first embodiment except that the fuel cell system 102 is provided with a test gas feeder 20, a test gas passage 22 through which a test gas is supplied from the test gas feeder 20, and a switching device 21 disposed in the fuel gas feeding passage 6 in the vicinity of the inlet of the PEFC1, for switching a gas supply source and that the flow rate detector 5 is provided not in the fuel gas passage 6 but in the test gas passage 22.

Herein, the test gas feeder 20 is composed of a steel cylinder charged with the test gas under pressure and a pressure regulating valve attached to the vent of the steel cylinder. The test gas may be any gases having chemical compositions that do not cause a chemical reaction with the membrane electrolyte assembly 1A. Preferably, the test gas contains at least one kind of gas selected from the group consisting of, for example, fuel gas, oxidizing gas, inactive gas, carbon dioxide, and methane mixed gas. The methane mixture gas is a naturalgas-basis gas containing methane as a chief component, ethane, propane, and butane. For example, the methane mixture gas may be "13A gas" used in the gas supply infrastructure in Japan. The inactive gas is a gas composed of chemically stable components such as nitrogen, argon and helium. Such a test gas does not cause damage to the inside of the fuel cell such as deterioration in catalytic power.

The switching device 21 is composed of a three-way valve. Alternatively, it may be composed of a plurality of electric-operated valves. That is, the switching device 21 should just be constructed such that it selectively connects the test gas feeder 22 and a fuel gas feeder side portion 6A of the fuel gas feeding passage 6 to a PEFC1 side portion 6B of the fuel gas feeding passage 6.

The airtightness value detecting operation of the fuel cell system 102 of the third embodiment does not differ from that of the fuel cell system 100 of the first embodiment except that the controller 10 controls the switching device 21 and the test gas feeder 20 in place of the fuel gas feeder 2. More specifically, when the oxidizing gas feeder 3 is in its stop state, the passage blocking device 4 is controlled to block off the fuel gas exhaust passage 8 and the switching device 21 is controlled to disconnect the fuel gas feeder 2 from the PEFC1 while connecting the test gas passage 22 to the PEFC1. Then, the test gas feeder 20 is controlled to supply the test gas to the PEFC1 at constant pressure. Thereafter, the controller 10 obtains the detected airtightness value Q based on the detected value of the flow rate detector 5.

The controller 10 controls the fuel cell system 102 based on the detected airtightness value Q so as to perform the airtightness value detecting operation and the service life estimating operation similarly to the first embodiment.

Thereby, the fuel cell system 102 can detect the airtightness of the PEFC1 without use of a special power source for test gas supply. As a result, the airtightness of the PEFC1 can be promptly, accurately detected while the fuel gas feeder 2 and the oxidizing gas feeder 3 being stopped, with a simplified structure and operation.

Fourth Embodiment

Figure 5:
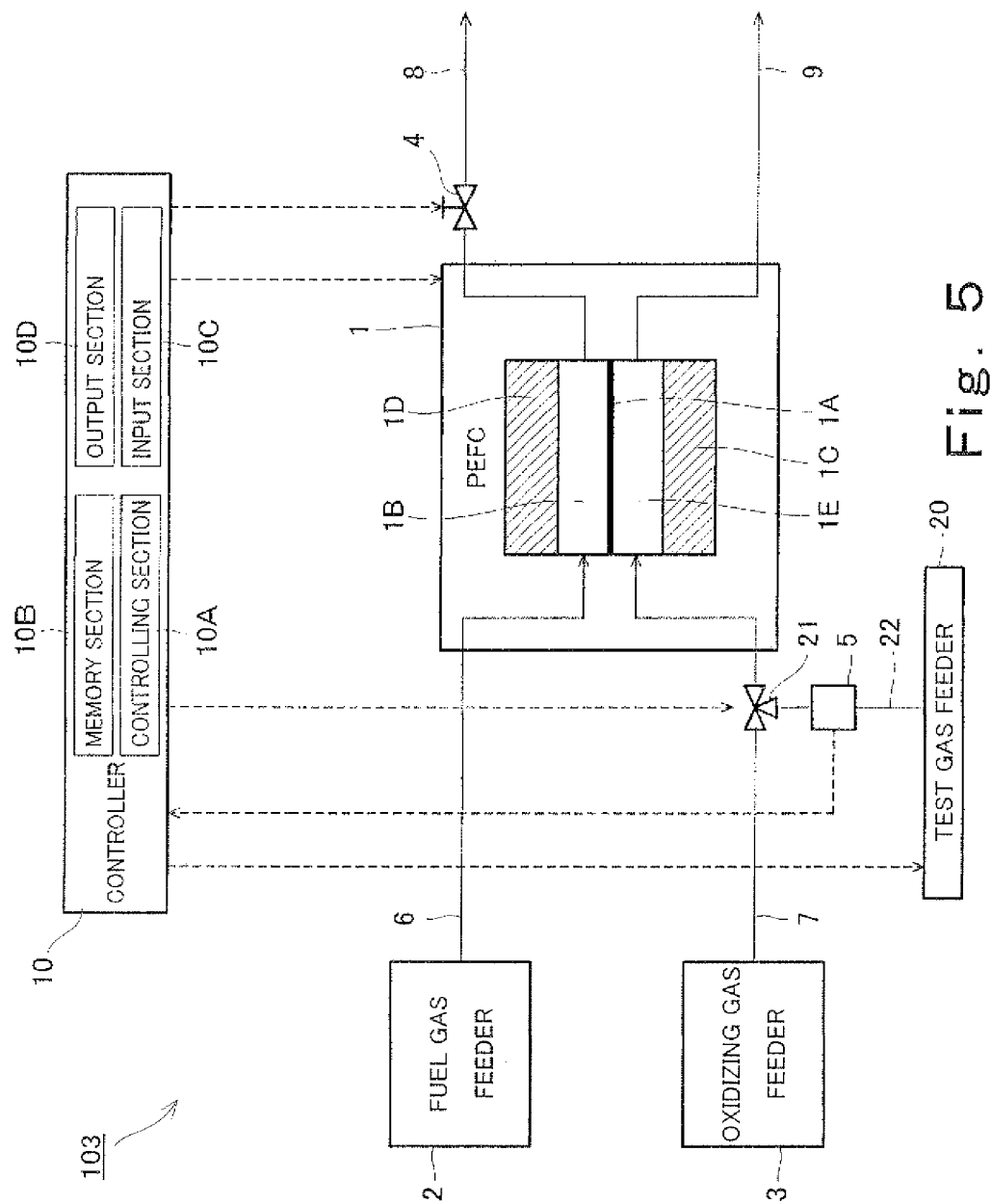
FIG. 5 is a schematic diagram illustrating a fuel cell system according to a fourth embodiment of the invention.

FIG. 5 is a schematic diagram illustrating a fuel cell system according to a fourth embodiment of the invention. In FIG. 5, the parts that are substantially equivalent or function similarly to those of FIG. 4 are identified with the same reference numerals as in FIG. 4, and an explanation of them is omitted in this embodiment.

The structure of the fuel cell system 103 of the fourth embodiment does not differ from those of the fuel cell systems 101, 102 of the second and third embodiments except that the fuel cell system 103 is provided with the test gas feeder 20, the test gas passage 22 through which the test gas is supplied from the test gas feeder 20, and the switching device 21 disposed in the oxidizing gas feeding passage 7 in the vicinity of the inlet of the PEFC1, and that the flow rate detector 5 is provided not in the oxidizing gas passage 7 but in the test gas passage 22.

The airtightness value detecting operation of the fuel cell system 103 of the fourth embodiment does not differ from that of the fuel cell system 101 of the second embodiment except that the controller 10 controls the switching device 21 and the test gas feeder 20 instead of the oxidizing gas feeder 3.

Specifically, when the fuel gas feeder 2 is in its stop state, the passage blocking device 4 is controlled to block off the oxidizing gas exhaust passage 9 and the switching device 21 is controlled to disconnect the oxidizing gas feeder 3 from the PEFC1 while connecting the test gas feeder 22 to the PEFC1. Then, the test gas feeder 20 is controlled to supply the test gas to the PEFC1 at constant pressure. Thereafter, the controller 10 obtains the detected airtightness value Q based on the detected value of the flow rate detector 5.

The controller 10 controls the fuel cell system 103 based on the detected airtightness value Q so as to perform the airtightness value detecting operation and the service life estimating operation similarly to the first embodiment.

In the fuel cell system 103, the airtightness of the PEFC1 is accordingly detected without use of a special power source for test gas supply similarly to the fuel cell system 102 of the third embodiment. As a result, the airtightness of the PEFC1 can be promptly, accurately detected while the fuel gas feeder 2 and the oxidizing gas feeder 3 being stopped, with a simplified structure and operation.

Fifth Embodiment

Figure 6:
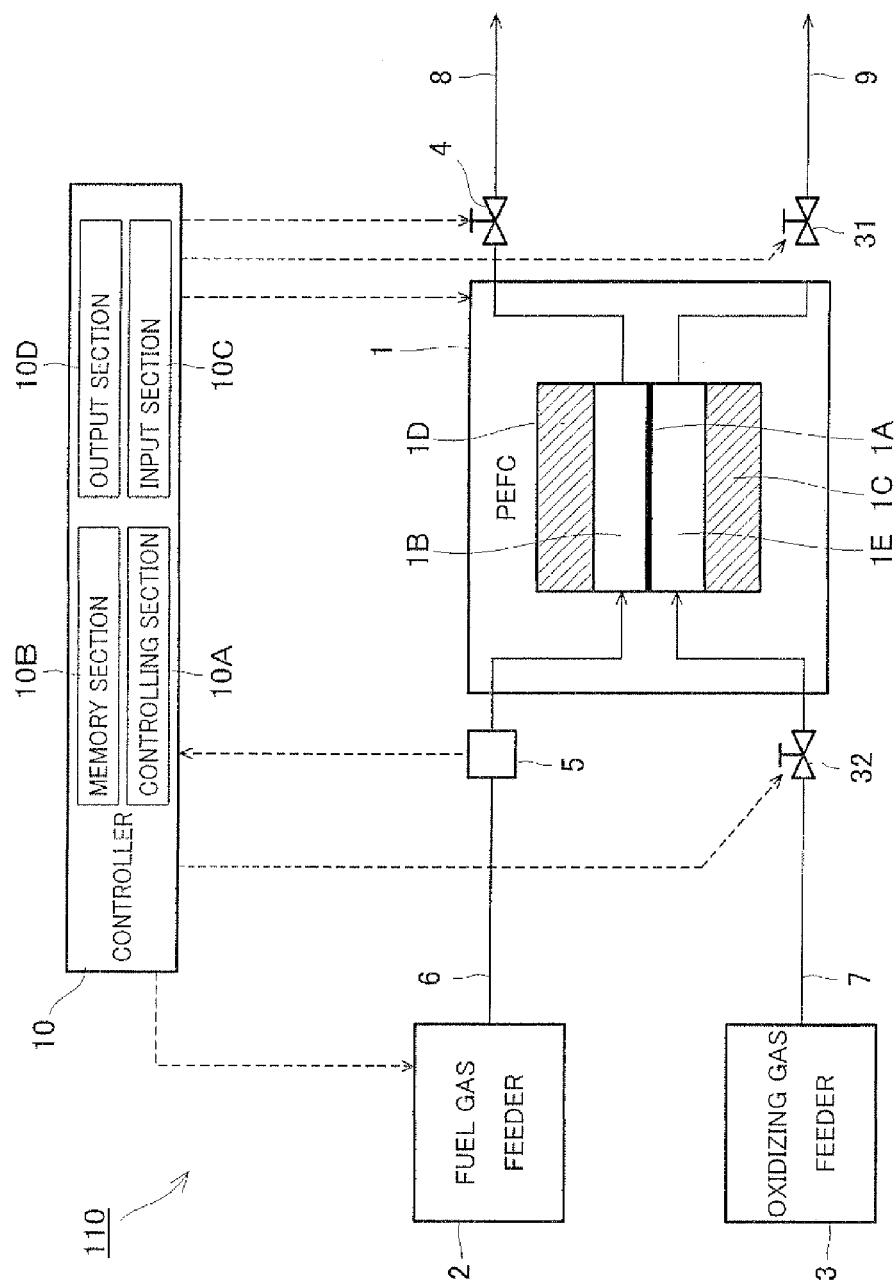
FIG. 6 is a schematic diagram illustrating a fuel cell system according to a fifth embodiment of the invention.

FIG. 6 is a schematic diagram illustrating a fuel cell system according to a fifth embodiment of the invention. In FIG. 6, the parts that are substantially equivalent or function similarly to those of FIG. 1 are identified with the same reference numerals as in FIG. 1, and an explanation of them is omitted in this embodiment.

The structure of the fuel cell system 110 of the fifth embodiment does not differ from that of the fuel cell system 100 of the first embodiment except that the fuel cell system 110 is provided with a second passage blocking device 31 disposed in the oxidizing gas exhaust passage 9 and a third passage blocking device 32 disposed in the oxidizing gas feeding passage 7 in addition to the passage blocking device (the first passage blocking device) 4 disposed in the fuel gas exhaust passage 8.

Next, the airtightness value detecting operation of the fuel cell system 110 of the fifth embodiment will be explained.

The controller 10 obtains two kinds of airtightness values, that is, a first detected airtightness value Qa and a second detected airtightness value Qb when the oxidizing gas feeder 3 is in its stop state. More concretely, the controller 10 controls the first passage blocking device 4 to block off the fuel gas exhaust passage 8; controls the second passage blocking device 31 to block off the oxidizing gas exhaust passage 9; and controls the third passage blocking device 32 to block off the oxidizing gas feeding passage 7. Then, the controller 10 controls the fuel gas feeder 2 thereby supplying the fuel gas at constant pressure. If gas leakage occurs in the PEFC1, the fuel gas feeder 2 will continuously supply the fuel gas to the PEFC1. Meanwhile, the controller 10 obtains the first detected airtightness value Qa based on the detected value of the flow rate detector 5.

The controller 10 controls the first passage blocking device 4 to block off the fuel gas exhaust passage 8; controls at least either the second passage blocking device 31 or the third passage blocking device 32 to open at least either the oxidizing gas feeding passage 7 or the oxidizing gas exhaust passage 9. Then, the controller 10 controls the fuel gas feeder 2 to supply the fuel gas at constant pressure while obtaining the second detected airtightness value Qb based on the detected value of the flow rate detector 5.

It does not matter which of the first and second detected airtightness values Qa, Qb is firstly obtained. That is, the first detected airtightness value Qa may be obtained after obtaining the second detected airtightness value Qb.

The controller 10 calculates a differential airtightness value (difference value) Qc that is the difference between the first and second detected airtightness values Qa and Qb (i.e., Qc=Qb−Qa).

Herein, the first detected airtightness value Qa represents the leakage from the PEFC1 to the outside, and the differential detected airtightness value Qc represents the leakage from the fuel gas passage 1D to the oxidizing gas passage 1E, that is, cross-leakage. Since this cross leakage varies mainly depending on the degree of damage to the polymer electrolyte membrane of the membrane electrode assembly 1A, the fluctuation of the differential airtightness value Qc precisely reflects the degree of damage to the polymer electrolyte membrane. Therefore, the fuel cell system 110 can detect the degree of damage to the polymer electrolyte membrane with high accuracy.

The controller 10 controls the fuel cell system 110 based on the differential airtightness value Qc so as to perform the airtightness value detecting operation and the service life estimating operation similarly to the first embodiment.

This enables the fuel cell system 110 to promptly, accurately detect the airtightness of the PEFC1 and, especially, the degree of damage to the polymer electrolyte membrane with a simplified structure and operation.

Example 1

Using a PEFC1 having one membrane electrode assembly 1A in which the polymer electrolyte membrane has a hole of about 3 mm in diameter, the fuel gas was supplied under a pressure of 2 kPa after blocking off the fuel gas exhaust passage 8, the oxidizing gas exhaust passage 9 and the oxidizing gas feeding passage 7. In this case, the differential airtightness value Qc was 18 ml/min. The output voltage of the PEFC1 when connected to a general-type electric load was 0.6V.

Another test was conducted by use of a PEFC1 having one membrane electrode assembly 1A in which the polymer electrolyte membrane has no holes through which the fuel gas can pass. In this test, the fuel gas was supplied under a pressure of 2 kPa after blocking off the fuel gas exhaust passage 8, the oxidizing gas exhaust passage 9 and the oxidizing gas feeding passage 7. In this case, the differential airtightness value Qc was 0 ml/min. The output voltage of the PEFC1 when connected to a general-type electric load was 0.8V. A further test was conducted by use of a PEFC1 having 52 membrane electrode assemblies 1A stacked therein. The fuel gas was supplied under a pressure of 2 kPa after blocking off the fuel gas exhaust passage 8, the oxidizing gas exhaust passage 9 and the oxidizing gas feeding passage 7. In this case, the differential airtightness value Qc was 0 ml/min.

It was found from the above tests that the invention was able to detect the degree of damage to the polymer electrolyte membrane with high accuracy. Specifically, the decrease in the output voltage is about 0.2V. Since the PEFC1 generally has about 50 membrane electrode assemblies 1A stacked therein, the output voltage of the PEFC 1 is several tens of volts. In view of this, the decrease (about 0.2V) in the output voltage is minute. In addition, it is assumable that other various factors than damage to the polymer electrolyte membrane may cause decreases in the output voltage. The method of detecting damage to the polymer electrolyte membrane from the differential airtightness value Qc has higher accuracy compared to the method of detecting it from changes in the output voltage.

Further, it was found that the invention was able to detect the degree of damage to the polymer electrolyte membrane quickly. Specifically, it took about 3 minutes to obtain the differential airtightness value Qc after blocking off the fuel gas exhaust passage 8, the oxidizing gas exhaust passage 9 and the oxidizing gas feeding passage 7.

Sixth Embodiment

Figure 7:
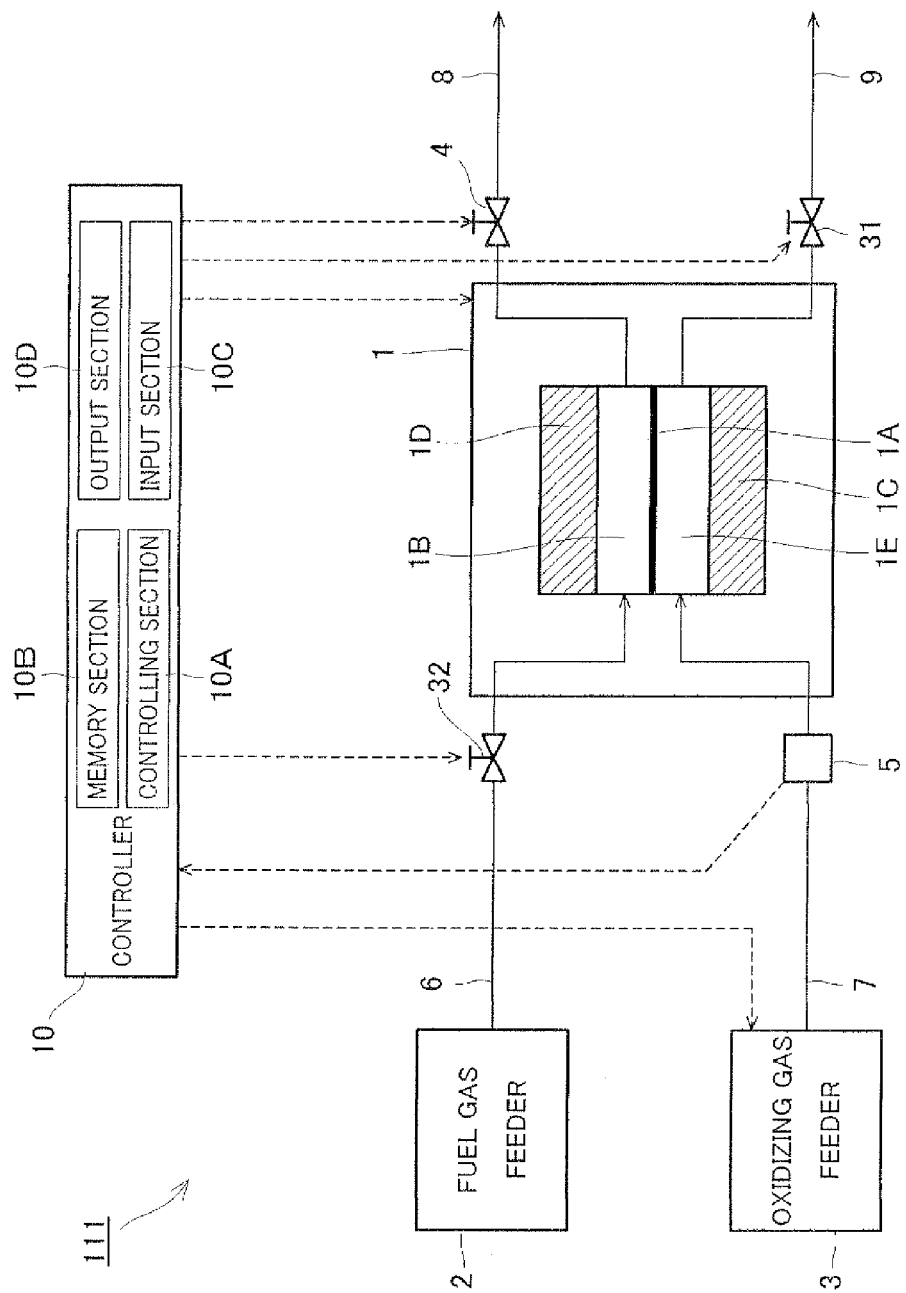
FIG. 7 is a schematic diagram illustrating a fuel cell system according to a sixth embodiment of the invention.

FIG. 7 is a schematic diagram illustrating a fuel cell system according to a sixth embodiment of the invention. In FIG. 7, the parts that are substantially equivalent or function similarly to those of FIG. 6 are identified with the same reference numerals as in FIG. 6, and an explanation of them is omitted in this embodiment.

The structure of the fuel cell system 111 of the sixth embodiment does not differ from that of the fuel cell system 110 of the fifth embodiment except that the flow rate detector 5 is provided not in the fuel gas feeding passage 6 but in the oxidizing gas feeding passage 7 and the third passage blocking device 32 is provided not in the oxidizing gas feeding passage 7 but in the fuel gas feeding passage 6.

The airtightness value detecting operation of the fuel cell system 111 of the sixth embodiment does not differ from that of the fuel cell system 110 of the fifth embodiment except that the controller 10 controls the oxidizing gas feeder 3 instead of the fuel gas feeder 2.

Specifically, when the fuel gas feeder 2 is in its stop state, two kinds of airtightness values, i.e., the first detected airtightness value Qa and the second detected airtightness value Qb are obtained. More concretely, the controller 10 controls the first passage blocking device 4 to block off the oxidizing gas exhaust passage 9; controls the second passage blocking device 31 to block off the oxidizing gas exhaust passage 8; and controls the third passage blocking device 32 to block off the fuel gas feeding passage 6. Then, the controller 10 controls the oxidizing gas feeder 3 to supply the oxidizing gas at constant pressure and obtains the first detected airtightness value Qa similarly to the fuel cell system 110.

Further, the controller 10 controls the first passage blocking device 4 to block off the oxidizing gas exhaust passage 9 and controls at least either the second passage blocking device 31 or the third passage blocking device 32 to open at least either the fuel gas feeding passage 6 or the fuel gas exhaust passage 8. Then, the controller 10 controls the oxidizing gas feeder 3 to supply the oxidizing gas at constant pressure while obtaining the second detected airtightness value Qb based on the detected value of the flow rate detector 5.

The controller 10 calculates that differential airtightness value Qc that is the difference between the first airtightness value Qa and the second airtightness value Qb (i.e., Qc=Qb−Qa).

The controller 10 controls the fuel cell system 111 based on the differential airtightness value Qc so as to perform the airtightness value detecting operation and the service life estimating operation similarly to the first embodiment.

Thereby, the fuel cell system 111 can promptly, accurately detect the airtightness of the PEFC1 and more particularly the degree of damage to the polymer electrolyte membrane with a simplified structure and operation. In addition, the risk of damage to the fuel cell system 101 caused by abnormal combustion of the fuel gas during the airtightness value detecting operation can be avoided.

Although the preferred embodiments of the invention have been discussed hereinabove, it is apparent that the invention is not necessarily limited to them. Numerous modifications and alternative embodiments of the invention will be apparent to those skilled in the art in view of the foregoing description.

Accordingly, the description is to be construed as illustrative only, and is provided for the purpose of teaching those skilled in the art the best mode of carrying out the invention. Further, it should be noted that the details of the construction and/or functions of the invention may be modified within the scope of the invention. For instance, the effects of the invention can be achieved by applying the test gas feeder 20, switching device 21 and test gas passage 22 of the third or fourth embodiment to the fuel cell system of the fifth or sixth embodiment.

INDUSTRIAL APPLICABILITY OF THE INVENTION

The fuel cell system of the invention is suitably used in a wide range of applications as it enables prompt, accurate detection of the airtightness of a fuel cell with a simple arrangement.

DRAWINGS

FIG. 1
  2: FUEL GAS FEEDER
  3: OXIDIZING GAS FEEDER
  10: CONTROLLER
  10A: CONTROLLING SECTION
  10B: MEMORY SECTION
  10C: INPUT SECTION
  10D: OUTPUT SECTION
FIG. 3
  2: FUEL GAS FEEDER
  3: OXIDIZING GAS FEEDER
  10: CONTROLLER
  10A: CONTROLLING SECTION
  10B: MEMORY SECTION
  10C: INPUT SECTION
  10D: OUTPUT SECTION
FIG. 4
  2: FUEL GAS FEEDER
  3: OXIDIZING GAS FEEDER
  10: CONTROLLER
  10A: CONTROLLING SECTION
  10B: MEMORY SECTION
  10C: INPUT SECTION
  10D: OUTPUT SECTION
  20: TEST GAS FEEDER
FIG. 5
  2: FUEL GAS FEEDER
  3: OXIDIZING GAS FEEDER
  10: CONTROLLER
  10A: CONTROLLING SECTION
  10B: MEMORY SECTION
  10C: INPUT SECTION
  10D: OUTPUT SECTION
  20: TEST GAS FEEDER
FIG. 6
  2: FUEL GAS FEEDER
  3: OXIDIZING GAS FEEDER
  10: CONTROLLER
  10A: CONTROLLING SECTION
  10B: MEMORY SECTION
  10C: INPUT SECTION
  10D: OUTPUT SECTION
FIG. 7
  2: FUEL GAS FEEDER
  3: OXIDIZING GAS FEEDER
  10: CONTROLLER
  10A: CONTROLLING SECTION
  10B: MEMORY SECTION
  10C: INPUT SECTION
  10D: OUTPUT SECTION

The invention claimed is:

1. A method of controlling a fuel cell system to detect airtightness, wherein the fuel cell system includes:
    a fuel cell having a fuel gas passage and an oxidizing gas passage which are so formed as to be in contact with an anode and a cathode respectively, the anode and the cathode being formed on opposed sides of a polymer electrolyte membrane respectively;
    a fuel gas feeder configured to feed a fuel gas to said fuel gas passage;
    an oxidizing gas feeder configured to feed an oxidizing gas to said oxidizing gas passage;
    a fuel gas exhaust passage configured to flow an excessive fuel gas discharged from said fuel gas passage;
    an oxidizing gas exhaust passage configured to flow an excessive oxidizing gas discharged from said oxidizing gas passage;
    a test gas feeder configured to feed a test gas to either said fuel gas passage or said oxidizing gas passage;
    a flow rate detector configured to detect a flow rate of the test gas;
    a first passage blocking device configured to block off either said fuel gas exhaust passage or said oxidizing gas exhaust passage to which the test gas is fed;
    a second passage blocking device and a third passage blocking device which are configured to respectively block off gas passages connected to an outlet side and an inlet side of said fuel gas passage which is not fed with the test gas, or respectively block off gas passages connected to an outlet side and an inlet side of said oxidizing gas passage which is not fed with the test gas; and
    a controller;
  wherein the method comprises the steps of:
  (a) controlling, by the controller, said first to third passage blocking devices to block off their associated passages, and the test gas feeder to feed the test gas to the fuel cell, and obtaining a first airtightness value of said flow rate detector,
  (b) controlling, by the controller, said first passage blocking device to block off its associated passage, while controlling said second and third passage blocking devices so as not to block off either of their associated passages, and obtaining a second airtightness value of said flow rate detector; and
  (c) obtaining a difference between the first airtightness value and the second airtightness value to determine airtightness of the fuel cell.

2. The method according to claim 1,
  wherein said test gas feeder is either said fuel gas feeder or said oxidizing gas feeder.

3. The method according to claim 1,
  wherein said test gas is composed of chemical components that do not cause a chemical reaction within said fuel cell.

4. The method according to claim 1,
  wherein said test gas contains at least one selected from a group consisting of fuel gas, oxidizing gas, inactive gas, carbon dioxide and methane mixed gas.

5. The method according to claim 1,
  wherein said controller has an output section for outputting the airtightness value to outside.

6. The method according to claim 1,
wherein said controller has a memory section for prestoring reference airtightness values for evaluation of the airtightness value, and
wherein said controller makes a comparison between the airtightness value and the reference airtightness values thereby evaluating the airtightness of said fuel cell.

7. The method according to claim 1,
wherein said controller has an output section for outputting the airtightness value which has been evaluated to outside.

8. The method according to claim 6,
wherein said controller adjusts operating conditions for said fuel cell based on the evaluated airtightness value.

9. The method according to claim 6,
wherein said controller obtains the airtightness value at specified detection time intervals and accumulatively stores the obtained airtightness values in said memory section in relation to an operating time of said fuel cell; and
wherein said controller obtains a transition line of the airtightness values relative to the operating time by a statistical approximation method and estimates a drop in the airtightness of said fuel cell based on a comparison between the transition line and the reference airtightness values.

10. The method according to claim 9,
wherein said controller alters the detection time intervals according to a locus of the transition line.

11. The method according to claim 9,
wherein the reference airtightness values stored in said memory section of said controller include a limit airtightness value representative of a service limit of said fuel cell; and
wherein said controller extrapolates the transition line to obtain an estimated operation time of said fuel cell left before the limit airtightness value is reached.

12. The method according to claim 1
wherein said controller has an output section for outputting an estimated remaining operation time to outside.

13. The method according to claim 11,
wherein said controller adjusts operating conditions for said fuel cell based on an estimated remaining operation time.

14. The method according to claim 1,
wherein the controller obtains the detected value or the airtightness value when starting up and/or stopping the operation of the fuel cell.

* * * * *